UNITED STATES PATENT OFFICE.

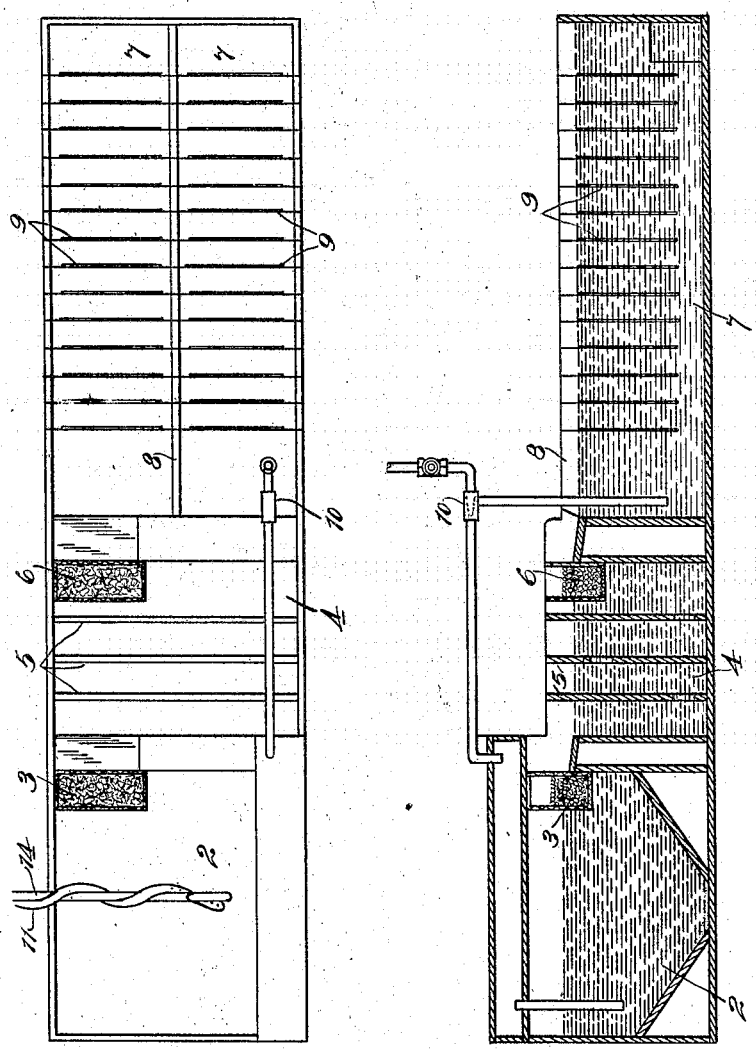
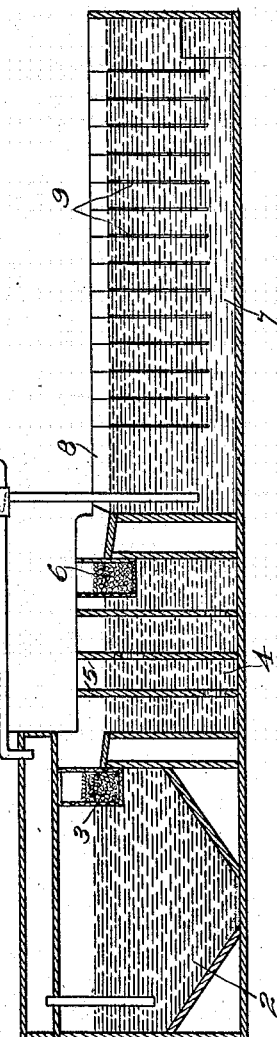
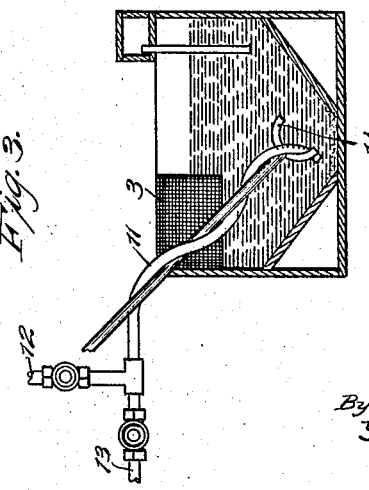

THOMAS A. ROSS, OF SELBY, CALIFORNIA.

RECOVERING SILVER FROM SOLUTION.

No. 901,124.          Specification of Letters Patent.          Patented Oct. 13, 1908.

Application filed March 30, 1908. Serial No. 424,242.

*To all whom it may concern:*

Be it known that I, THOMAS A. ROSS, citizen of the United States, residing at Selby, in the county of Contra Costa and State of California, have invented new and useful Improvements in Recovering Silver from Solution, of which the following is a specification.

My invention relates to a means for recovering silver from solution; and especially in a device for agitating the solution in a dissolving tank during the process.

It consists in the combination of parts, and in details of construction which will be more fully explained by reference to the accompanying drawings, in which—

Figure 1 is a plan. Fig. 2 is a longitudinal section. Fig. 3 is a transverse section through the dissolver.

The silver is dissolved in sulfuric acid, and the solution is decanted into a tank 2, which is called a "dissolver". The solution is then in the form of a sulfate of silver. This solution must be continually agitated in this tank, and this agitation has been formerly effected by the use of manually-operated paddles or stirrers, necessitating the constant attention of an operator.

In my device I employ air or steam under pressure, which is introduced through a perforated pipe into the bottom of the dissolver in such a manner as to cause a steady and perfect agitation.

In the operation of recovering silver from such solution, the solution is passed through a coke filter, at 3, and into a settler 4; this settler having vertical partitions 5, with openings or spaces alternately near the bottom, and near the top so that the solution flowing there-through takes a sinuous course. It then passes through a second coke filter 6, and into the precipitating tank 7. This tank is here shown with a central longitudinal diaphragm and partition 8 so that the solution may flow through the tank upon one side of the diaphragm, and return upon the other.

The tank is filled with copper-plates 9 which are suspended so as to be immersed in the passing solution, and the silver contained in the solution is precipitated upon these plates. The silver being thus deposited upon the plates and the solution having parted with the greater portion of the silver, it is again returned into the dissolver 2 by pump or injector.

In the present case I have shown a steam injector 10, the suction branch of which extends into the precipitating tank, and the other end discharges into the dissolver 2. The steam thus employed in the injector, keeps the solution at a temperature most favorable for the operation. The depleted solution returned to the dissolver and agitated therein again becomes saturated with the silver sulfate contained in the dissolver, and again passes through the precipitator until the silver in the dissolver is substantially exhausted, and a new charge supplied.

In order to keep up the proper agitation in the dissolver 2, I have shown a pipe 11 extending into the bottom of the dissolver tank and perforated. This pipe may be provided with a valved pipe 12 to admit air under pressure, and a second valved pipe 13, through which steam may be admitted, if desired; the valves controlling the amount of air or steam to be used.

The pipe is preferably carried upon a stirrer 14 about which it coils, so that the lower perforated end may be moved about within the solution to discharge the compressed fluid therefrom into the solution, thus thoroughly agitating all parts, and causing it to be thoroughly saturated with the silver. By this means the agitation of the solution is effected automatically, and without special care, needing but a single attendant to look after the plates in the precipitator, and the other parts of the process.

The same agitating device may be applied to the manufacture of copper sulfate, which requires a similar agitation.

Having thus described my invention, what I desire to secure by Letters Patent is—

1. Means for agitating value-bearing solutions, said means comprising a stirrer-member and a flexible pipe having its lower end carried by the stirrer-member and freely movable thereby and adapted to inject a compressed fluid into the body of the solution.

2. In an apparatus for recovering values from their solution, a dissolving tank, means for circulating the solution to and from a precipitating tank, and a freely movable device within the tank for injecting a compressed fluid into the solution and agitating the solution within the dissolving tank.

3. In an apparatus for recovering values from solutions, a dissolving tank, a settler and a precipitating tank in series, means for conveying the solution through said tanks, means for returning the solution from which the value has been precipitated, to the dissolving tank, and means for continuously agitating the solution within said tank, said means comprising a stirrer-member and a pipe coiled thereabout and having its lower end perforated and capable of being moved about within the solution, said end adapted to discharge a fluid under pressure into the body of the solution.

4. In an apparatus for recovering values from their solution, a dissolving tank, a settler and a precipitating tank through which the solution is caused to pass, means for returning the depleted solution from the precipitating tank, said means consisting of an injector, and a conductor by which the solution is returned to the dissolving tank, an agitator consisting of a stirrer-member and a flexible pipe coiled about the same and having its lower end extending into the bottom of the dissolving tank and movably mounted and having perforations, said pipe being adapted to discharge jets of fluid under compression through the solution.

In testimony whereof I have hereunto set my hand in presence of two subscribing witnesses.

THOMAS A. ROSS.

Witnesses:
J. EMIL PETERSEN,
ALMON T. ROSS.